United States Patent [19]

Doerr et al.

[11] 3,981,541
[45] Sept. 21, 1976

[54] SHALLOW UNDERGROUND COAL SLURRY CONCENTRATION SUMP

[75] Inventors: Richard E. Doerr; David L. McCain; Hilbert D. Dahl, all of Ponca City, Okla.

[73] Assignee: Continental Oil Company, Ponca City, Okla.

[22] Filed: Apr. 15, 1974

[21] Appl. No.: 461,034

[52] U.S. Cl. ............................ 302/11; 37/54; 37/58; 299/18; 302/14; 302/15
[51] Int. Cl.² ............... B65G 53/30; E21C 47/00
[58] Field of Search ........................ 302/11–16, 302/56, 58; 37/54, 58, 60, 69, 115; 209/172, 490, 460; 299/17, 18, 19, 7–9

[56] References Cited
UNITED STATES PATENTS

| 595,457 | 12/1897 | Lay | 299/7 |
|---|---|---|---|
| 823,960 | 6/1906 | McDougall | 299/19 |
| 1,166,713 | 1/1916 | Otterson | 302/14 |
| 1,856,836 | 5/1932 | Howell | 299/7 |
| 2,880,981 | 4/1959 | Bergstrom | 299/9 |
| 3,269,777 | 8/1966 | Maclellan | 302/14 |
| 3,314,679 | 4/1967 | Kolln | 302/15 |
| 3,490,812 | 1/1970 | Uchida | 302/14 |

*Primary Examiner*—Evon C. Blunk
*Assistant Examiner*—Jeffrey V. Nase
*Attorney, Agent, or Firm*—William J. Miller

[57] ABSTRACT

In order to concentrate coal slurry from a plurality of mine faces being pumped through a plurality of individual pipes, a shallow sump is formed by digging a trench along a mine tunnel and the individual pipes empty into the sump. The product, such as coal, is allowed to settle to the bottom where it is picked up and pumped out of the mine at a controlled concentration, thereby improving the pumping efficiency of the pipeline system.

11 Claims, 9 Drawing Figures

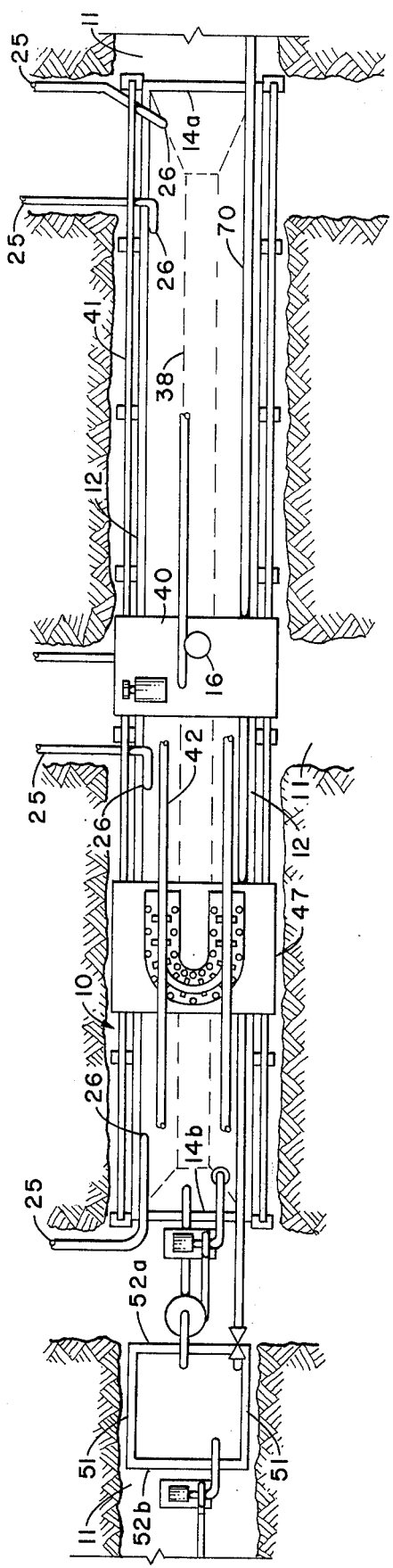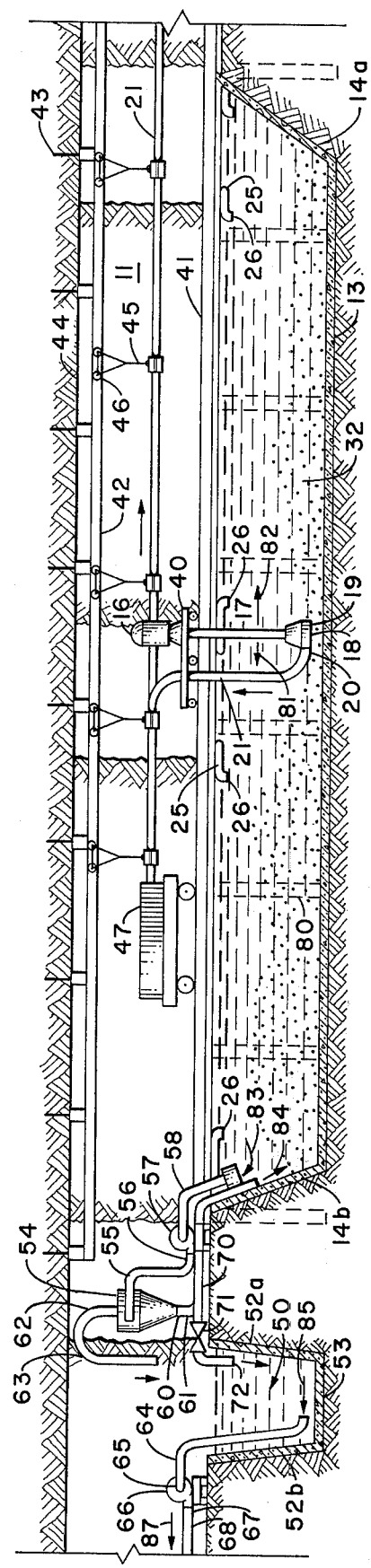
FIG. 3
FIG. 4

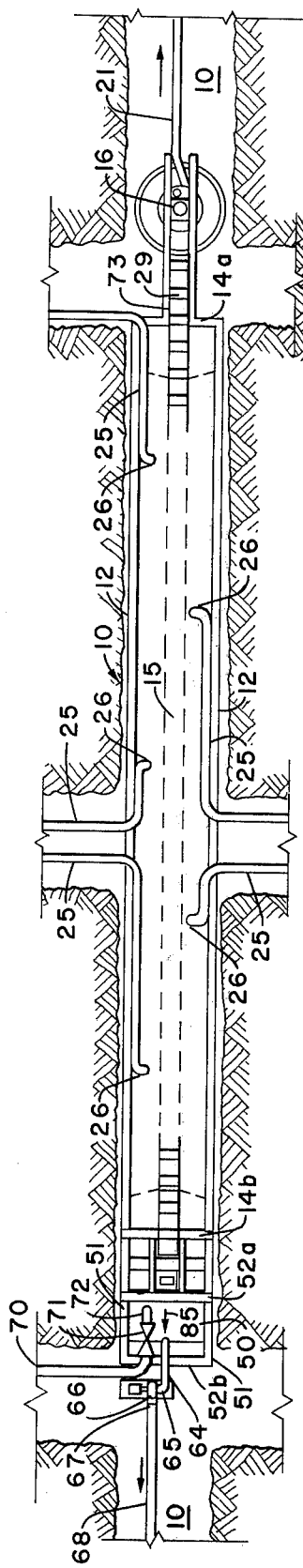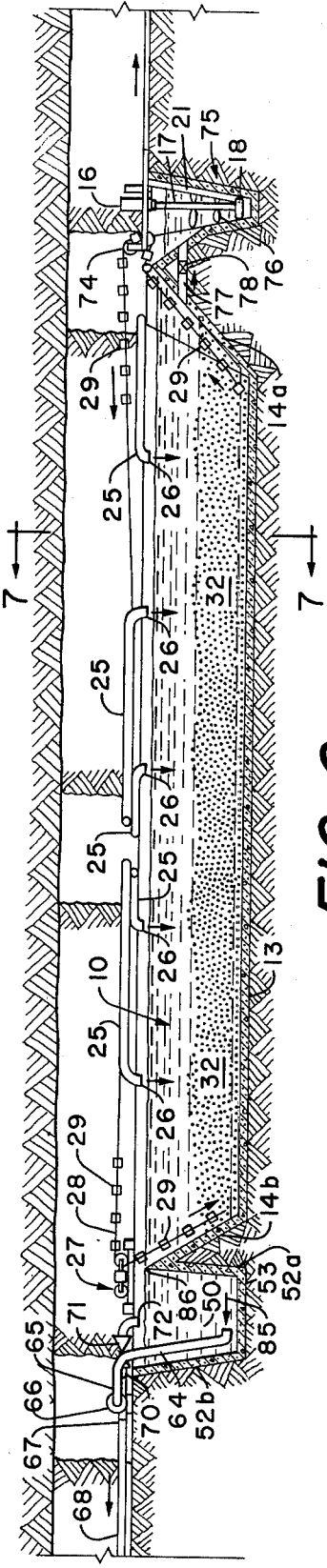

SHALLOW UNDERGROUND COAL SLURRY CONCENTRATION SUMP

BRIEF DESCRIPTION OF THE PRIOR ART

The patent to J. A. MacLellan entitled "Hydraulic Hoisting," No. 3,269,777, shows a shallow sump formed in a mine for the purpose of water concentration. A storage tank is formed in the mine for concentrating the slurry wholly separate from the water storage sump.

BRIEF DESCRIPTION OF THE INVENTION

This invention comprises a shallow underground sump having a plurality of slurry lines which empty the product into the sump where the product can be concentrated and pumped from the sump at a much higher concentration and thereby a much higher efficiency. The shallow sump is formed by digging a trench along a mine tunnel and lining the sides and bottom with reinforced concrete.

In one embodiment a depression is formed halfway between the ends and a pump inserted into the depression. Bucket drag lines are provided to move the coal which has dropped to the bottom toward and into the depression.

In another embodiment the depression is formed adjacent one end of the sump, and the drag lines have buckets attached thereto which move the product from the bottom end into the adjacent depression. A pump mounted in the depression removes the product at a controlled concentration.

A fines separation system can also be incorporated by forming a second depression, pumping the surface water through a centrifugal separator, and returning the fines to the sump and depositing the water in the second depression. Instead of a centrifugal separator, a settling basin can be provided where, after a period of time, the settled material is returned to the sump and the water permitted to flow to another depression through a weir, siphon, or pump.

BRIEF DESCRIPTION OF THE FIGURES

FIG. 3 is a top view of a second embodiment of the sump illustrated in FIG. 1 where the depression runs the length of the sump and the pump moves along the depression on rails and including a fines separator and water sump;

FIG. 4 is a side cross-sectional view of the sump illustrated in FIG. 3;

FIG. 5 is a variation of the embodiment illustrated in FIG. 3 wherein a plurality of buckets remove the product from the longitudinal central depression and deposit it in a sump adjacent one end;

FIG. 6 is a side cross-sectional view of the sump illustrated in FIG. 5;

FIG. 7 is a cross-sectional view taken through lines 7—7 of FIG. 6;

DETAILED DESCRIPTION OF THE FIGURES

Figure 1:
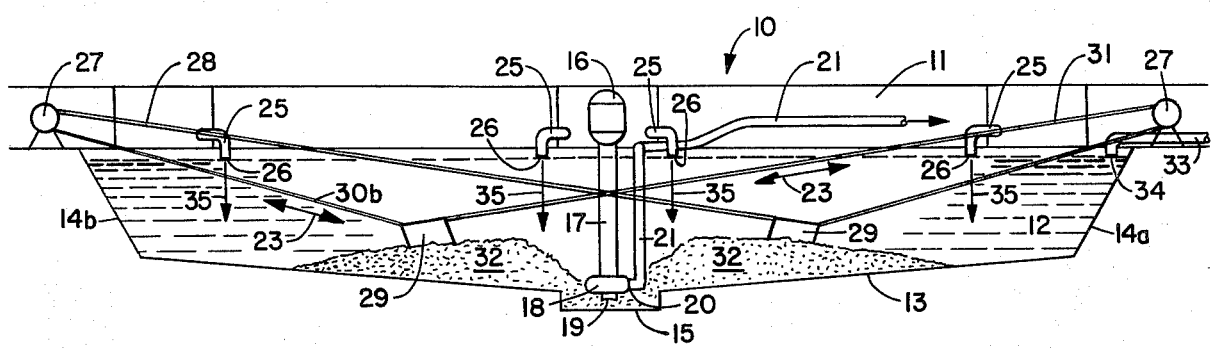
FIG. 1 is a cross-sectional view of a shallow sump having a central depression.
Figure 2:
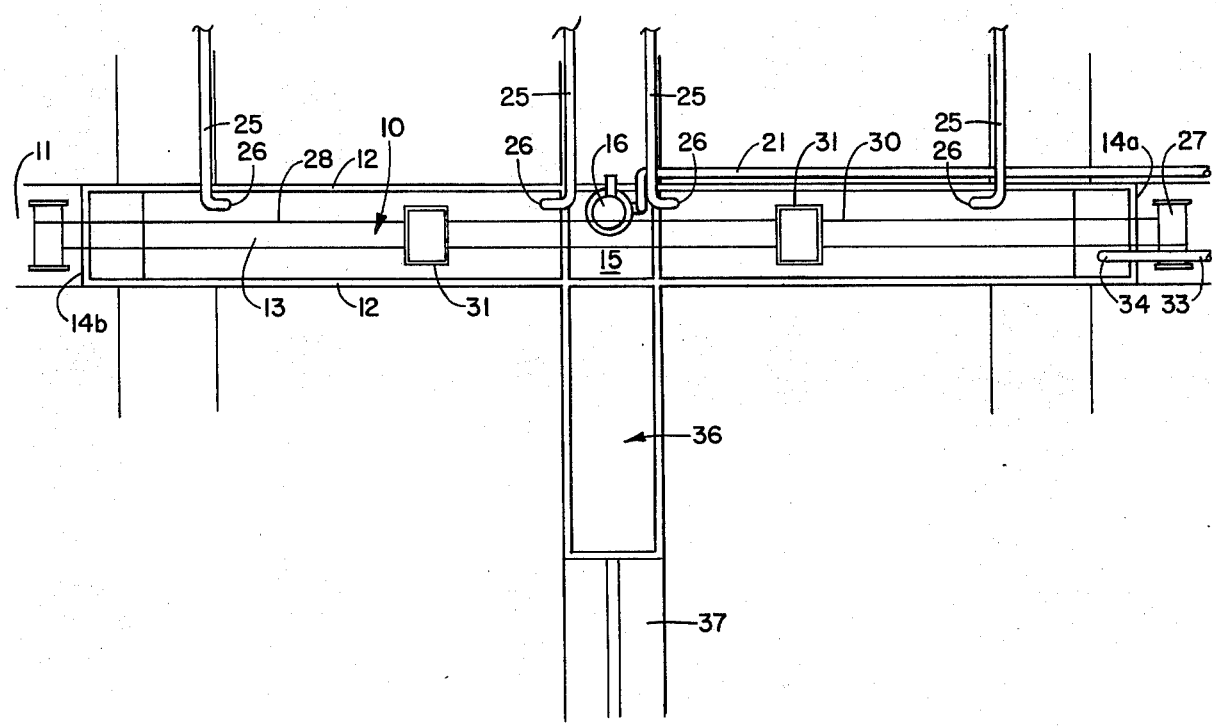
FIG. 2 is a top view of the sump shown in FIG. 1.

Referring to FIGS. 1 and 2 are the basic sump 10 is illustrated which is formed by digging a shallow trench along a mine tunnel 11 by any usual means, such as a continuous mining machine, or example. The sump comprises side walls 12, a bottom 13, and ends 14a and 14b. All of the side walls, bottom, and ends may be lined with reinforced concrete to prevent sloughing of the wall material into th sump. Midway between ends 14a and 14b is a depression 15 of sufficient depth to accommodate a pumping apparatus consisting of a pump motor 16, a pump extension 17, and a pump 18 which is positioned in depression 15. Pump 18 has an inlet 19 and an outlet 20 which is connected through pipe 21 to the surface of the mine and will usually terminate in a preparation plant where the coal is separated from rock and other material in the usual manner. A plurality of slurry pipelines 25 empties into the sump 10 through ends 26.

On each end 14a and 14b is mounted a winch 27. It is obvious, of course, that a single winch can be used and then the remaining one will comprise a pulley. A wire rope 28 passes around winch 27 and connects to a fines bucket 29 which in turn connects to a cable 30a around winch 27 to cable 31 to a second bucket 29 which returns by a second cable 30b to winch 27. A plurality of product 32 is deposited from slurry pipeline 25 into sump 10 which will fall to bottom 13. Additional water may be supplied to sump 10 through water inlet pipe 33 which terminates in an outlet 34 positioned near end 14a of sump 10.

Referring to FIG. 2, tunnel 37 may have an additional sump 36 formed therein which will provide additional water capacity for the sump. Suitable valves may be incorporated in any of the slurry lines or water line and are not illustrated.

OPERATION

The embodiment shown in FIGS. 1 and 2 operates as follows:

Slurry from pipes 25 falls into sump 10 through outlet 26. The sump will gradually fill with water and product 32. When sufficient product is deposited into sump 10, winch 27 begins to operate, pulling cables 31 and 28 in the direction of arrow 23. Buckets 29 will then drag the product and dump it into depression 15 where it is sucked into inlet 19 by pump 18 connected to outlet 20 and pipe 21. Motor 16 can be operated at sufficient speeds through suitable gear reduction boxes or other well known means to provide a slurry concentration of about 50 percent. If additional water must be added to the sump, pipe 33 through outlet 34 can add as much water as needed. Water can also be decanted from sump 10 by adding a pump near the surface of the water or by providing additional sumps as illustrated in the remaining figures.

Referring to FIGS. 3 and 4, sump 10, rather than having a central depression 15, has a longitudinal depression 38. Pump motor 16, rather than being permanently mounted as is the pump illustrated in FIG. 1, is mounted on a platform 40 which is journaled to a track 41 through a plurality of wheels 42. Pipe 21 must move with platform 40 since pump 18 is mounted to platform 40. In order to accommodate this movement, a pair of rails 42 is mounted by means of roof bolts 43 to the roof 44 of the mine tunnel 11. Supported by rails 42 is a plurality of hooks 45 which are free to roll along rails 42 by means of rollers 46. A conveyor 47, which is also mounted on tracks 41, provides a means for transferring the hose from one rail 42 to the second rail 42. Basically, the monorail system for supporting a length of slurry hose operates by storing a length of hose on monorail 42a and, as it is needed by the movement of pump platform 40, is transferred by way of conveyor 47 to monorail 42b by an amount sufficient to accommodate the movement of platform 40. As the platform 40 moves in a manner to require less length of hose, the hose is again transferred via conveyer 47 to monorail 42a for storage.

Adjacent end 14b is provided a second sump functioning as a water reservoir or depression 50 which has side walls 51, ends 52a, 52b, and bottom 53. A centrifugal separator 54 is mounted between end 14b and 52a and has its inlet pipe 55 connected to the outlet 56 of a pump 57. The inlet of pump 57 is connected through a pipe 58 to sump 10. Separator 54 has a solids outlet 60 connected through a pipe 61 to sump 10 and a fluids outlet 62 connected through a pipe 63 to water reservoir 50. A pipe 64 is connected to the inlet 65 of a water pump 66 which has its outlet 67 connected to a pipe 68 which communicates with the various mine faces and provides water for the slurry system. Additional water can be added through pipe 70, through a valve 71, to an outlet 72 which adds water to water reservoir 50. Rails 41 may be supported in any manner and in this embodiment are supported by pillars 80.

OPERATION

The embodiment illustrated in FIGS. 3 and 4 operates as follows:

Slurry is supplied to sump 10 through pipes 25 and 26. The slurry concentration can be nearly pure water to as high as 50 percent from pipe 26. Thus it is important that the slurry be concentrated in an effort to improve the transportation efficiency of this system as it is pumped from the mine. As the slurry is added to the sump, it falls to the bottom as a product 32. Pump 18 mounted on platform 40 moves along rail 41 gradually sucking up the product into inlet 19 along a depression 38. Pump 18 can move in either direction as illustrated by arrows 81 or 82. As it moves hose 21 must follow. In order to do so, a monorail support system was disclosed and its operation explained above. In order to supply needed water to the coal faces, water is sucked out of main sump 10 in the direction of arrow 83 and into pipe 58 through pump 57 to solids centrifugal separator 54. The fines are returned through pipe 61 to the sump 10 as indicated by arrows 84. Water is added from the coal separator 54 through pipe 63 to reservoir or depression 50. As water is needed at the various coal faces, it is provided as indicated by arrow 85 into pipe 64 through pump 66 and out pipe 68 as indicated by arrow 87 to the respective coal faces as needed. Additional water can be supplied through pipe 70 by opening valve 71 and permitting the water to fall from outlet 72 into reservoir or depression 50.

Referring to FIGS. 5, 6, and 7, a modified version of the sump shown in FIGS. 3 and 4 is illustrated and differs mainly in the method for removing the product from the longitudinal depression 15. In this embodiment a pair of chains 73 has a plurality of buckets 29 attached therebetween. Chains 73 pass over a pulley arrangement 74 and back to winch 27 where buckets 29 are again returned to the bottom 13 and into depression 15. A small sump 75 is formed adjacent end 14a and has mounted therein motor 16, which has an extension 17 attached to pump 18. Stirring members 76 are attached to pump extension 17 and serve to keep the concentration of slurry uniform throughout the sump. Pipe 21 connected to pump 18 removes the slurry as previously discussed in the other figures. A weir 77 communicates between large sump 10 and small sump 75 to provide water to small sump 75 as needed. Valve 78 controls the amount of water passing between the two sumps. A second pair weir 86 communicates between large sump 10 and water reservoir 50 and permits surface water to flow from sump 10 over the weir 86 and into reservoir 50. Additional water can be added to the reservoir through pipe 70 which will discharge through outlet 72 into reservoir 50. Valve 71 will permit control of the water entering reservoir 50.

OPERATION

Operation of the sump described in FIGS. 5 through 7 is similar to the sump illustrated in FIGS. 1 and 2 with the exception that the buckets pull the product 32 up end 14a and dump the product into small sump 75. As previously discussed, motor 16 will operate pump 18 to remove the slurry through pipe 21 to the surface of the mine. Blades 76 will continue stirring the slurry in small sump 75, thereby maintaining its concentration. The water reservoir is maintained full by either overflow from the large sump 10 over weir 86 and into reservoir 50 or by opening valve 71 and permitting water to flow through pipe 70 out the outlet 72 into reservoir 50.

Figure 8:
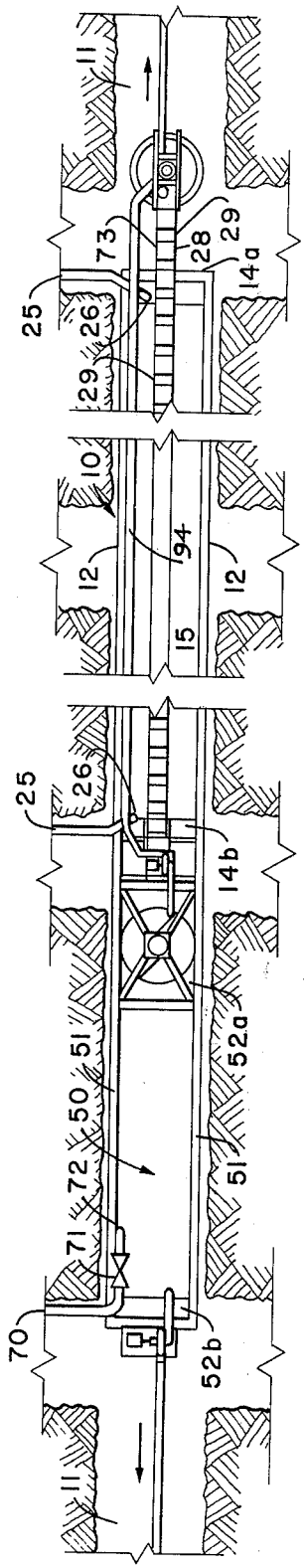
FIG. 8 is a top view of a variation of the sump illustrated in FIG. 5 and including a fines settling sump positioned between the water sump and the product sump.
Figure 9:
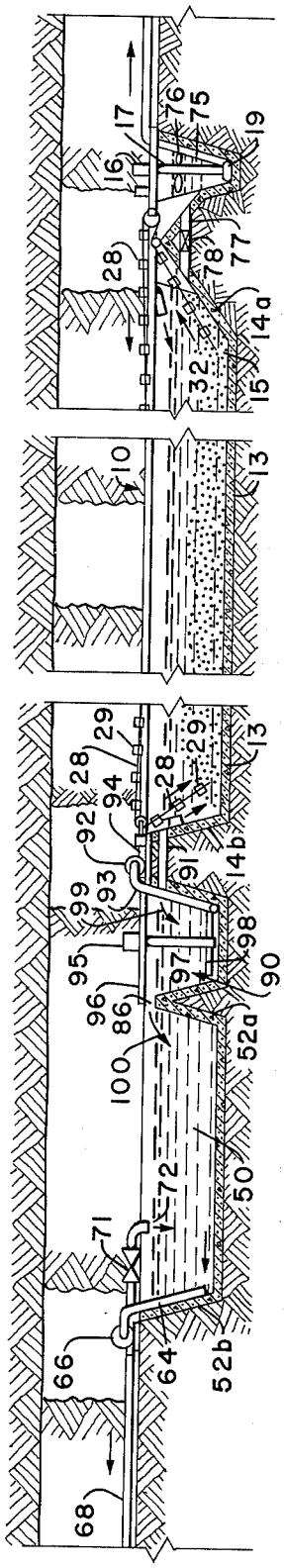
FIG. 9 is a cross-sectional view of the sump illustrated in FIG. 8 taken through the center line of the sump.

FIGS. 8 and 9 illustrate a second method of removing the fines as compared to FIGS. 3 and 4 where the fines were removed by a centrifugal separator. A fines settling sump 90 is formed between large sump 10 and water reservoir 50. Surface water is free to pass large sump 10 over weir 91 to settling sump 90 and from settling sump 90 over weir 86 to water reservoir 50. A fines pump 92 has its inlet connected through a pipe 93 and its outlet connected through a pipe 94 to sump 10. A motor 95 is attached to a mounting 96 over settling sump 90. A shaft 97 is attached between motor 95 and a stirring vane 98.

OPERATION

The sump illustrated above operates as follows:

Slurry pipes 25 add material through outlet 26 to large sump 10. Chains 73, which are connected to buckets 29, pull the material from depression 15 up end 14a and into small sump 75. The operation of the sump and water control aspects are identical to those described in FIGS. 5 through 7 and will not be described here again. As the water and fines build up in sump 10, the water and small fines will flow over weir 91 in the direction of arrow 99 and into fines pump 90. Motor 95 through shaft 97 stirs vane 98, lifting the fines which settle out, concentrating them and permitting them to be pumped through pipe 93, through pump 92, out pipe 94, and into small sump 75. Water flowing over weir 86 in the direction of arrow 100 and into water reservoir 50 will be fairly clean. Water from reservoir 50 will be pumped to the respective mine faces as previously described by pump 66 pulling water through pipe 64 and ejecting it into pipe 68.

CONCLUSIONS

A long and narrow sump which is relatively shallow has been disclosed along with several modifications of the sump. The water has been illustrated as being separated by weirs; however, it is obvious that surface pumps can be utilized. It is also obvious that the various sumps disclosed may be lined with concrete, plastic or other materials to prevent water leakage into porous ground. The sump disclosed herein is capable of handling coal water slurries from a plurality of mine faces and delivering fairly clean water to each of the respective mine faces. While the water may fluctuate considerably, depending upon how many mine faces are operating, the water level can be maintained fairly level without a great deal of difficulty. In some situations clean water is not necessary since there may not be sharp bends or pumping systems where fines will eventually clog the pipeline. In these systems fines separation is not necessary; however, where it becomes necessary to eliminate fines, the embodiments disclosed can effectively do so.

It is obvious, of course, that other modifications in the arrangement of the sumps, their size, and depth, and particular methods for removal of the product can be accomplished in view of the teachings in the specification and appended claims.

What we claim is:

1. In an underground mine slurry system including a sump for a plurality of slurry lines inside said mine wherein said mine has at least a tunnel, said sump comprising:
   a sump means formed in the floor of said tunnel, said sump means having a bottom, side walls and ends, the length of said sump means equal to or greater than four times the depth of said sump means and said sump means adapted to be filled with water or slurry;
   a depression;
   pump means having an inlet and an outlet, said inlet communicating with said depression;
   slurry removal means communicating with said outlet; a plurality of slurry outlet means spaced along said sump means and communicating with a plurality of respective mine faces whereby product deposited from said slurry outlet means will fall to the bottom of said sump means; and
   mechanical conveying means for moving said product toward and into said depression.

2. A sump as described in claim 1 wherein said depression is formed intermediate said ends in said bottom and wherein said pump means is mounted in said depression.

3. A sump as described in claim 2 wherein said depression is formed halfway between said ends and said mechanical means for removing said product toward and into said depression comprises:
   a first winch mounted adjacent one of said ends and a second winch mounted adjacent said remaining end;
   cable means interconnecting said winches; and
   bucket means attached to said cable means and in communication with the bottom of said trench whereby movement of said winch in one direction will cause said bucket means to move toward said depression pulling product into said depression and moving said winch in the opposite direction and cause said bucket means to move toward the end of said sump means.

4. A sump as described in claim 3 wherein the bottom of said sump means slopes from each end toward said depression.

5. A sump as described in claim 1 wherein said depression is formed adjacent one of said ends, and weir means for decanting water from said pump means into said depression.

6. A sump as described in claim 5 wherein said mechanical means for moving said product toward and into said depression comprises a plurality of buckets attached to a continuous belt, said belt having a length sufficient to extend over said depression and along the bottom of said sump means, whereby product can be picked up by said buckets, moved over said depression, and deposited into said depression.

7. A sump as described in claim 6 wherein the bottom of said sump means is dimensioned between said sidewalls to be equal to or greater than the width of said buckets and wherein the bottom of said sump means tapers downwardly to a lowest portion.

8. A sump as described in claim 5 wherein a second depression is formed adjacent one of said ends, weir means communicating between said second depression and said sump means for moving fluid from said sump means to said second depression, and pump means having an inlet and an outlet, said inlet communicating with said second depression and said outlet communicating with said respective mine faces.

9. In an underground mine slurry system including a sump and having a plurality of slurry lines inside said mine, wherein said mine has at least a tunnel, said sump comprising:
   a first sump means formed in the floor of said tunnel having a bottom, side walls, and ends, said first sump means adapted to be filled with water or slurry;
   a second sump means formed adjacent one of said ends;
   means for decanting water from said first sump means to said second sump means;
   a plurality of slurry outlet means spaced along the first sump means and communicating with a plurality of respective mine faces whereby product removed from said mine faces passes to said slurry outlets;
   first pump means having an inlet and an outlet, said inlet communicating with said second sump means and said outlet communicating with a plurality of respective mine faces; rail means extending along the length of said first sump means;
   cart means maintained to move along said rail means;
   second pump means mounted on said cart means having an inlet and an outlet, said inlet extending down in close proximity to said bottom, and said outlet communicating a means for moving said product from said mine; and
   means for removing said product deposited on the bottom of said first sump means.

10. A sump as described in claim 9 wherein said means for decanting water from said first sump means into said second sump means comprises weir means communicating between said first sump means and said second sump means.

11. A sump as described in claim 9 wherein the means for decanting water from said first sump means into said second sump means comprises:
   a third pump means having an inlet and an outlet, said inlet communicating with said first sump means;
   a centrifugal separator having a product inlet; and fluid outlet and a particles outlet, said product inlet communicating with said third pump means outlet, said particles outlet communicating with said first pump means, and said fluid outlet communicating with said second sump means.

* * * * *

UNITED STATES PATENT OFFICE
CERTIFICATE OF CORRECTION

PATENT NO. : 3,981,541
DATED : September 21, 1976
INVENTOR(S) : Richard E. Doerr et al It is certified that error appears in the above-identified patent and that said Letters Patent are hereby corrected as shown below:

Column 6, line 1, "pump" should be --sump--.

Column 6, line 36, "the" should be --said--.

Signed and Sealed this

Fourteenth Day of December 1976

[SEAL]

Attest:

RUTH C. MASON
*Attesting Officer*

C. MARSHALL DANN
*Commissioner of Patents and Trademarks*